United States Patent
Kashimoto

(10) Patent No.: US 9,019,562 B2
(45) Date of Patent: Apr. 28, 2015

(54) IMAGE FORMING APPARATUS THAT PERFORMS COLOR CONVERSION SPECIFIC TO A PARTICULAR GRAPHIC FORM

(71) Applicant: KYOCERA Document Solutions Inc., Osaka (JP)

(72) Inventor: Yosuke Kashimoto, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/067,147

(22) Filed: Oct. 30, 2013

(65) Prior Publication Data

US 2014/0118791 A1    May 1, 2014

(30) Foreign Application Priority Data

Oct. 31, 2012    (JP) .................................. 2012-241212

(51) Int. Cl.
  *G06K 15/00*    (2006.01)
  *H04N 1/60*    (2006.01)
  *G06K 15/02*    (2006.01)

(52) U.S. Cl.
  CPC ............ *H04N 1/6072* (2013.01); *G06K 15/188* (2013.01)

(58) Field of Classification Search
  CPC .................... G06K 19/06103; G06K 2209/25; H04N 1/32144; H04N 1/3211
  USPC ........... 358/1.9, 2.1, 518, 3.28; 382/164, 165, 382/180, 217
  See application file for complete search history.

(56) References Cited

U.S. PATENT DOCUMENTS

2002/0093684 A1 *    7/2002    Bares et al. .................. 358/3.01
2008/0204774 A1 *    8/2008    Matsushima .................. 358/1.9

FOREIGN PATENT DOCUMENTS

| JP | 09-193477 | 7/1997 |
| JP | 2005-223380 A | 8/2005 |
| JP | 2012-124764 | 6/2012 |

* cited by examiner

*Primary Examiner* — Barbara Reinier
(74) *Attorney, Agent, or Firm* — McDonnell Boehnen Hulbert & Berghoff LLP

(57) ABSTRACT

An image forming apparatus includes a specific graphic form storage section, an image determination section, and determination color conversion processing section. The specific graphic form storage section is configured to store a visual image of a specific graphic form and attribute information specific to the specific graphic form as a reference image and reference attribute information, respectively. The image determination section is configured to determine at least one of (i) whether or not an image matching with the reference image is included in target data and (ii) whether or not an image having the reference attribute information is included in the target data, and detect the image identified through the determination as an image corresponding to the specific graphic form. The color conversion processing section is configured to perform specific color conversion processing for the image corresponding to the specific graphic form.

21 Claims, 9 Drawing Sheets

IMAGE FORMING APPARATUS THAT PERFORMS COLOR CONVERSION SPECIFIC TO A PARTICULAR GRAPHIC FORM

REFERENCE TO RELATED APPLICATIONS

This application is based upon and claims the benefit of priority from the corresponding Japanese Patent Application No. 2012-241212, filed in the Japan Patent Office on Oct. 31, 2012, the entire contents of which are incorporated herein by reference.

FIELD

The present disclosure relates to an image forming apparatus capable of reproducing a specific graphic form such as a logo mark in a defined color.

BACKGROUND

Unless otherwise indicated herein, the description in this background section is not prior art to the claims in this application and is not admitted to be prior art by inclusion in this section.

In typical color output devices, such as printers and monitors, reproducibility of a color range is device-dependent. Hence, a target exhibiting an original color may be reproduced in different colors on different devices.

Therefore, color-space compression has been used to correct a color value by compressing a color space having a color range, in a process known as gamut mapping.

For example, as illustrated in FIG. 9A, one correction method causes each color value in a color space to move relatively so as to maintain its lightness. Further, as illustrated in FIG. 9B, a second correction method maintains a chroma balance while moving a color value in a color space.

Incidentally, color reproducibility on an object-by-object basis is not taken into consideration even by those methods for color space compression. Therefore, in a case of outputting a specific graphic form whose color is strictly defined such as a logo mark and a design mark of a company, it is not possible to reproduce the color with accuracy.

A typical color printing apparatus performs color correction by using a color correction function defined for each object based on an attribute (e.g. such as raster, vector, and text) of the object interpreted from print data.

According to the typical color printing apparatus, the same color correction is performed uniformly for each object, and hence if an image including a logo mark as a graphic form is subjected to the color correction suitable for the logo mark, other graphic forms than the logo mark are also subjected to the same color correction.

Further, a typical image processing apparatus substitutes a specific color with a special color, while subjecting colors other than the specific color to normal color conversion.

According to the typical image processing apparatus, each pixel is converted into the same color uniformly, and hence if the color of the logo mark is set as the specific color, other pixels formed of the specific color are also substituted by the same color.

SUMMARY

An image forming apparatus according to one embodiment of the present disclosure includes a specific graphic form storage section, an image determination section, and a color conversion processing section. The specific graphic form storage section is configured to store a visual image of a specific graphic form and attribute information specific to the specific graphic form as a reference image and reference attribute information, respectively. The image determination section is configured to determine at least one of (i) whether or not an image matching with the reference image is included in target data and (ii) whether or not an image having the reference attribute information is included in the target data, and detect the image identified through the determination as an image corresponding to the specific graphic form. The color conversion processing section is configured to perform specific color conversion processing for the image corresponding to the specific graphic form.

Further, a non-transitory computer-readable recording medium according to one embodiment of the present disclosure stores an image forming program that is executable by a processor of an image forming apparatus. The image forming program includes a first to a third program codes. The first program code causes the processor to store a visual image of a specific graphic form and attribute information specific to the specific graphic form as a reference image and reference attribute information, respectively. The second program code causes the processor to determine at least one of (i) whether or not an image matching with the reference image is included in target data and (ii) whether or not an image having the reference attribute information is included in the target data, and detect the image identified through the determination as an image corresponding to the specific graphic form. The third program code causes the processor to perform specific color conversion processing for the image corresponding to the specific graphic form.

An image forming method according to one embodiment of the present disclosure includes that a specific graphic form storage section stores a visual image of a specific graphic form and attribute information specific to the specific graphic form as a reference image and reference attribute information, respectively, an image determination section determines at least one of (i) whether or not an image matching with the reference image is included in target data and (ii) whether or not an image having the reference attribute information is included in the target data, and detects the image identified through the determining as an image corresponding to the specific graphic form, and a color conversion processing section performs specific color conversion processing for the image corresponding to the specific graphic form.

Additional features and advantages are described herein, and will be apparent from the following detailed description and the figures.

DETAILED DESCRIPTION

Figure 1:
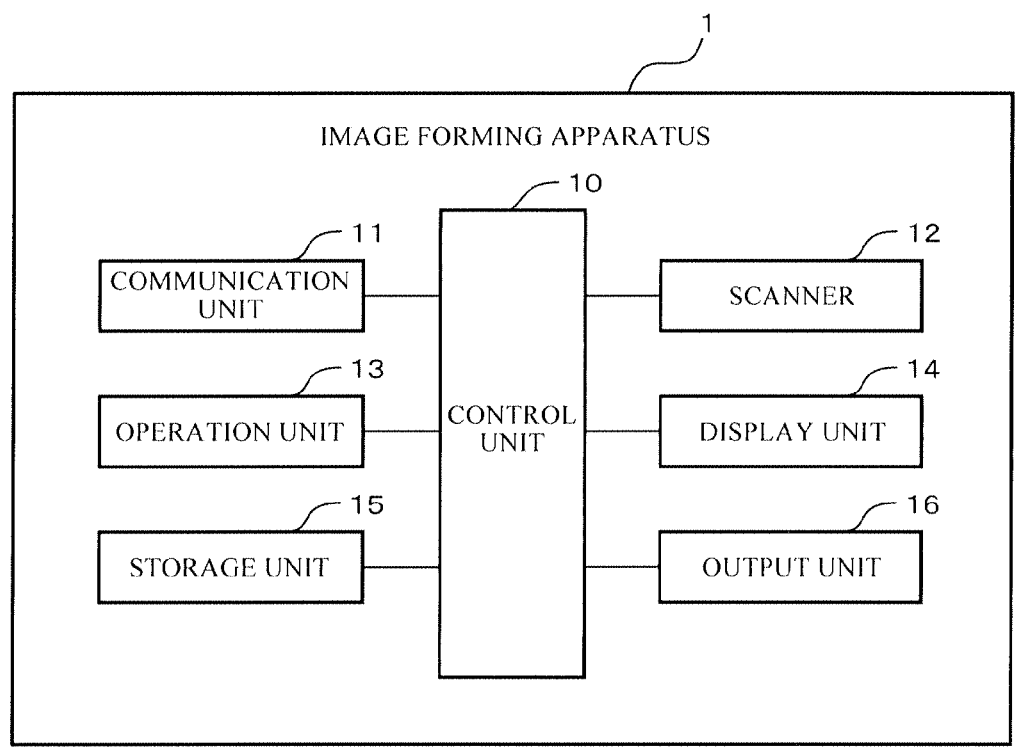
FIG. 1 illustrates a configuration of an image forming apparatus according to an embodiment of the present disclosure.

FIG. 1 illustrates a configuration of an image forming apparatus according to an embodiment of the present disclosure.

An image forming apparatus 1 according to the present embodiment first registers a reference image for identifying a specific graphic form such as a logo mark. The image forming apparatus 1 detects, if the reference image is included in target data, the corresponding image as the specific graphic form, and performs color conversion processing therefor by a specific color conversion method or the like. The image forming apparatus 1 is, for example, a multifunction peripheral (MFP).

The image forming apparatus 1 includes a communication unit 11 that receives print data (e.g. PDL) from a personal computer or the like (hereinafter referred to as "PC or the like"), a scanner 12 that reads an original of the target and extracts a visual image therefrom at a time of copy or at a time of scan, an operation unit 13 including a touch panel or a numeric keypad, a display unit 14 including a liquid crystal panel, a storage unit 15 including an HDD or the like capable of storing various programs and data, an output unit 16 that performs printing processing for the image obtained by interpreting the print data or the image read by the scanner 12, and a control unit 10 that includes a CPU, a ROM, and a RAM and controls each of the components.

According to the image forming apparatus 1 of the present embodiment, irrespective of whether or not a processing target is the print data received from the PC or the like or the visual image read by the scanner 12, or irrespective of what kind of configuration the logo mark has, the logo mark can be correctly detected and reproduced in a defined color with accuracy. In order to obtain such actions and effects, the control unit 10 performs an operation for each of functional blocks illustrated in FIG. 2.

Figure 2:
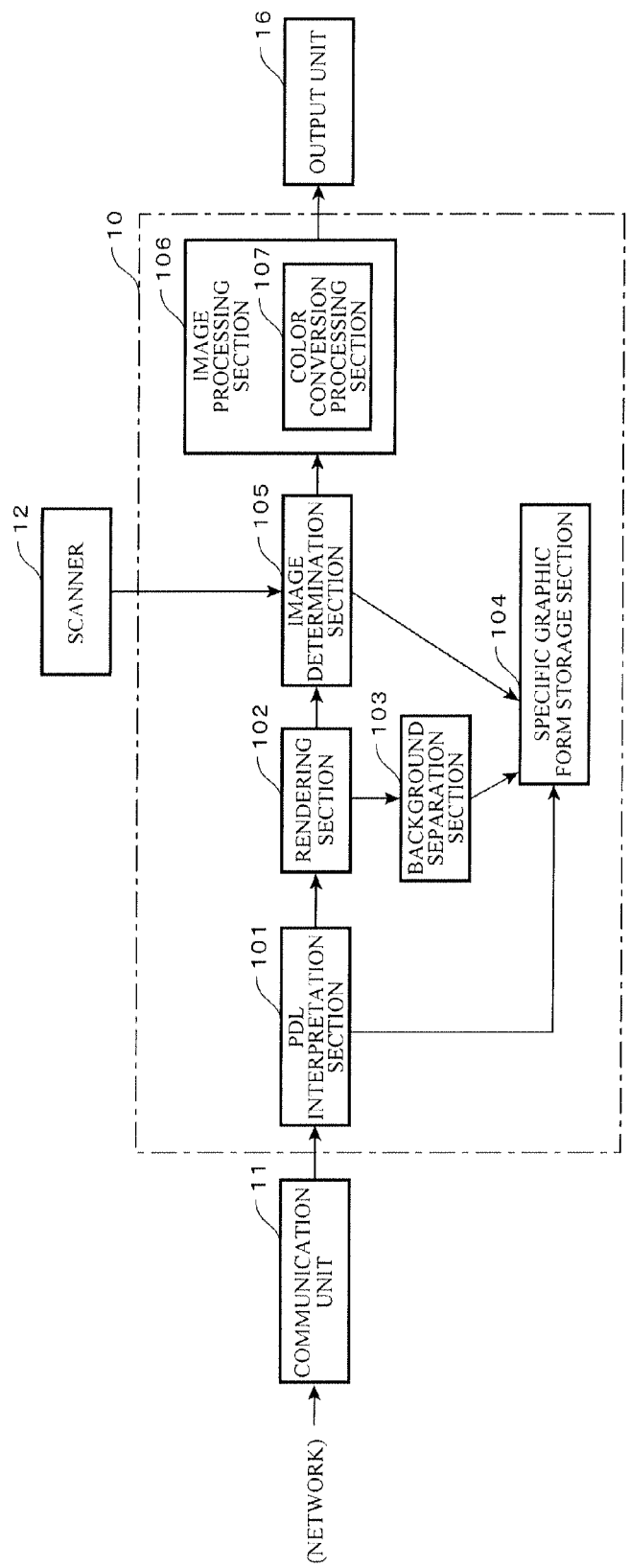
FIG. 2 illustrates functional blocks of the image forming apparatus according to the embodiment of the present disclosure.

FIG. 2 illustrates functional blocks of the image forming apparatus according to the embodiment of the present disclosure.

As illustrated in FIG. 2, the control unit 10 includes a PDL interpretation section 101, a rendering section 102, a background separation section 103, a specific graphic form storage section 104, an image determination section 105, an image processing section 106, and a color conversion processing section 107.

The PDL interpretation section 101 interprets the print data received from the PC or the like, to thereby extract an object to be rendered and attribute information thereon (e.g. color, shape, and the like thereof). The PDL interpretation section 101 outputs the extracted object and attribute information thereon to the rendering section 102.

Note that, the PDL interpretation section 101 performs an operation for extracting the logo mark as the specific graphic form and the attribute information thereon that are included in the print data at a time of registration of the logo mark to output the logo mark and the attribute information to the rendering section 102 and output the attribute information to the specific graphic form storage section 104.

The rendering section 102 generates the visual image by rasterizing the object received from the PDL interpretation section 101 based on the attribute information.

The background separation section 103 and the specific graphic form storage section 104 are executed mainly at the time of registration of the logo mark.

The background separation section 103 separates a background from an image for registration formed of the logo mark and its background, and acquires only the logo mark.

The specific graphic form storage section 104 stores a reference image and reference attribute information that are used to identify the logo mark.

The reference image is the visual image of the logo mark, and is used to identify the logo mark in terms of an external shape.

The reference attribute information is the attribute information specific to the logo mark, and includes, for example, the color, the shape, and the like of the logo mark. If the logo mark is formed of a plurality of objects, the reference attribute information is generated for each individual object.

Further, the reference attribute information also includes a color conversion method or a color value necessary to reproduce a color specific to the logo mark (see the color conversion processing section 107 or the like described later).

Note that, the reference attribute information and the reference image can be registered via the PC or the like.

For example, the image of the logo mark with the background is generated by an application of the PC or the like, and is transmitted to the image forming apparatus 1 as the print data by a fixed operation. Further, the attribute information specific to the logo mark is transmitted to the image forming apparatus 1 as meta-information on the print data.

When the image forming apparatus 1 receives the print data from the PC or the like, the PDL interpretation section 101 interprets the print data to extract the meta-information, output the meta-information to the specific graphic form storage section 104, and output the objects of the logo mark and the background and the meta-information (e.g. attribute information such as color value) thereon to the rendering section 102.

The rendering section 102 renders an image formed of the logo mark and the background based on the objects and the attribute information thereon that have been received from the PDL interpretation section 101. With this operation, the visual image of the logo mark (with the background) as illustrated in FIG. 3B is generated.

Subsequently, for the visual image, the background separation section 103 identifies an area of the background by designating a background color ("white" for a white background), and separates the logo mark from the background. The background separation section 103 outputs only the visual image of the separated logo mark to the specific graphic form storage section 104.

The specific graphic form storage section 104 stores the visual image of the logo mark received from the background separation section 103 and the meta-information received from the PDL interpretation section 101 as the reference image and the reference attribute information, respectively.

Figures 3A, 3B:
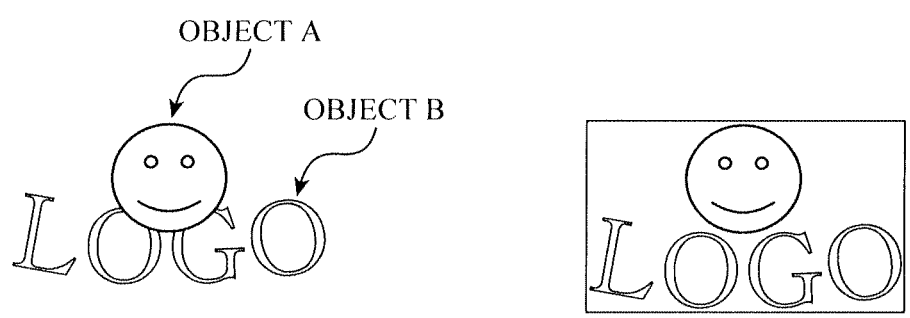
FIGS. 3A and 3B illustrate an example of a logo mark as a specific graphic form.

As a result, the logo mark obtained by removing the background from the image illustrated in FIG. 3B is registered as the reference image, and as illustrated in FIG. 3A, each piece of reference attribute information corresponding to an object A and an object B that form the logo mark is registered.

The image determination section 105 determines whether or not (either or both) an image matching the reference image is included in the target data and whether or not (either or both) an image having the reference attribute information is included therein, and detects the image identified through the determination as the logo mark.

The image determination section 105 performs pattern matching between the target data and the reference image if the target data is a visual image, and detects the image identified through the pattern matching as the logo mark.

According to this arrangement, even if the visual image read by the scanner 12 is used as the target to be processed, the visualized logo mark can be detected correctly. This resolves a conventional problem in which the logo mark cannot be detected correctly with only the attribute information.

If the target data is the print data, the image determination section 105 detects, as the logo mark, the image identified through the determination as to any one of or both of (i) whether or not the visual image of the object included in the print data and the reference image match with each other based on the pattern matching therebetween and (ii) whether or not the image having the reference attribute information is included in the print data.

The first determination (i) involves detecting the logo mark by performing the pattern matching between the visual image obtained by interpreting the print data on the target by the PDL interpretation section 101 and rendering the data by the rendering section 102 and the reference image stored in advance.

The second determination (ii) involves detecting an object as the logo mark if the object in the print data is identified to have a matching color, shape, and the like with those indicated by the reference attribute information.

If the target is the print data, the logo mark can be detected based on any one of the determinations (i) and (ii), but the determination (i) and the determination (ii) may be carried out in a superimposed manner.

According to this arrangement, not only the logo mark serving as the object but also the logo mark pasted in a frame as an image can be detected correctly.

Note that, the pattern matching can be exemplified by a method of searching the target data for a target that matches with a fixed reference pattern based on feature information such as edge information.

Figure 4:
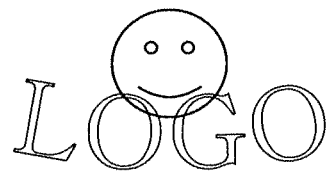
FIG. 4 illustrates an edge image of the logo mark illustrated in FIGS. 3A and 3B.

For example, as illustrated in FIG. 4, an edge is extracted from the logo mark registered as the reference image to first generate an edge image as a reference pattern.

Figure 5:
FIG. 5 illustrates an example of an image being a processing target.
Figure 6:
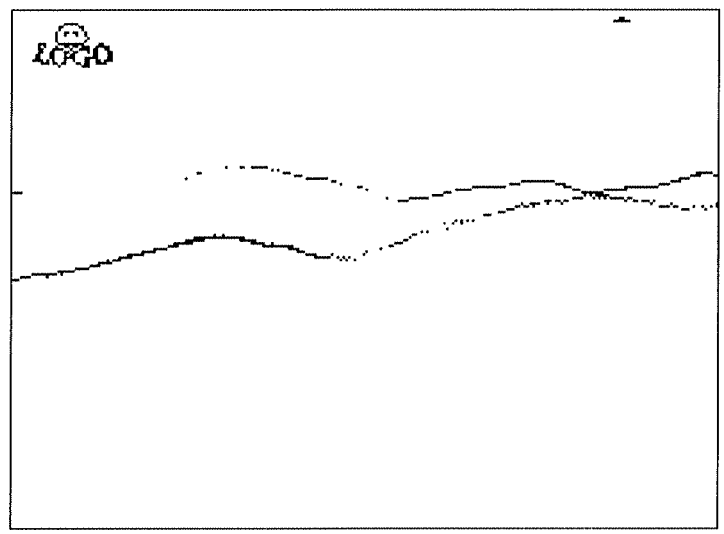
FIG. 6 illustrates the edge image of the image being the processing target illustrated in FIG. 5.

When the visual image illustrated in FIG. 5 is input as the target to be processed, the edge is extracted from the image, and the edge image is generated as illustrated in FIG. 6.

Then, the entire edge image illustrated in FIG. 6 is searched for an image area that matches with the edge image illustrated in FIG. 4, and the matched area can be detected as the logo mark.

The image processing section 106 subjects the rendered visual image to image processing such as color conversion processing and screen processing. After that, the image data that has been subjected to the image processing is output to the output unit 16, and moves on to the printing processing.

The color conversion processing section 107 serves to perform the color conversion processing in the image processing section 106. As a general operation, the color value of the rendered visual image is converted into the color value that can be output with reference to a color conversion table obtained by associating an input color value (RGB) with an output color value (CMYK).

Note that, by using color space compression (gamut mapping) for correcting a difference in color range, it is possible to correct the output color value in the color conversion table to an appropriate value.

The color conversion processing section 107 according to the present embodiment performs specific color conversion processing for the logo mark detected by the image determination section 105.

Specifically, the color conversion is performed in accordance with the color conversion method included in the reference attribute information. For example, the color conversion table edited for the logo mark is provided, and the color conversion can be performed for the logo mark by using the color conversion table.

Further, the color value can be substituted by a value included in the reference attribute information. That is, without referring to the color conversion table, the color value can be directly substituted for by the output color value (CMYK) defined for the logo mark.

According to this arrangement, the color required for the logo mark can be reproduced with stability and accuracy without being affected by the fluctuation in a measured color value due to precision of the scanner 12 and displacement of the color value involved in the color space compression.

Note that, the color conversion processing section 107 performs normal color conversion processing for portions other than the logo mark. This prevents a conventional problem in which the part other than the logo mark is subjected to inappropriate color processing while ensuring color reproducibility of the logo mark.

As described above, according to the image forming apparatus 1 of the present embodiment, the specific graphic form storage section 104 previously stores the reference image and the reference attribute information for identifying the specific graphic form. The image determination section 105 determines either or both of whether or not the image matching with the reference image is included in the target data or whether or not the image having the reference attribute information is included in the target data, and detects the image identified through the determination as the image corresponding to the specific graphic form.

Therefore, even when the specific graphic form is formed of image data from the scanner 12 or other such case or when the specific graphic form is formed of a plurality of objects, the specific graphic form can be detected correctly.

Further, according to the image forming apparatus 1 of the present embodiment, the color conversion processing section 107 performs the color conversion processing for the image of the detected specific graphic form by using the specific color conversion method, or performs substitution by the specific color value, while performing the normal color conversion processing for the part other than the specific graphic form.

Therefore, even where there is a fluctuation in an input value of a color conversion target due to various circumstances, the color demanded as the specific graphic form can be reproduced accurately to be output, and the image other than the specific graphic form can be subjected to the normal color conversion processing without a problem.

Next, a description is made of a procedure for registering the logo mark.

Figure 7:
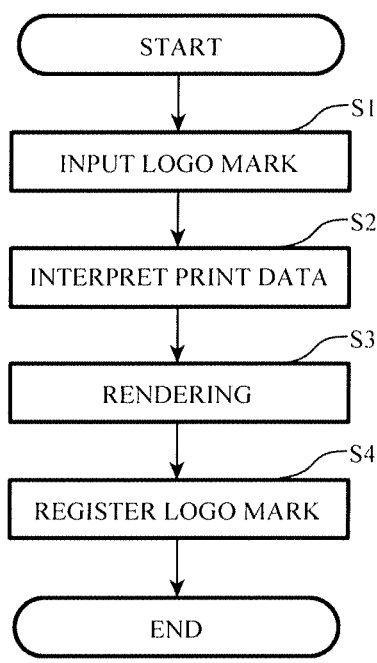
FIG. 7 illustrates a procedure for registering the logo mark.

FIG. 7 illustrates a procedure for registering the logo mark.

As illustrated in FIG. 7, first, a logo mark is input (S1).

For example, an image of the logo mark with a background is generated by the PC or the like, and is transmitted to the image forming apparatus 1 as the print data by a fixed operation. Further, the color, the shape, and the like of the logo mark and the color conversion method and the color value that are necessary to reproduce the color of the logo mark are transmitted as meta-information along with the print data.

Subsequently, the print data is interpreted (S2).

Specifically, the PDL interpretation section 101 extracts the meta-information from the print data received from the PC or the like, outputs the meta-information to the specific graphic form storage section 104, and outputs the objects of the logo mark and the background and the meta-information to the rendering section 102.

Subsequently, rendering is performed (S3).

Specifically, the rendering section 102 generates a visual image formed of the logo mark and the background based on the objects and the meta-information that have been received from the PDL interpretation section 101. Then, the background separation section 103 separates the logo mark from the background, and outputs only the visual image of the logo mark to the specific graphic form storage section 104.

Then, the logo mark is registered (S4).

In particular, the specific graphic form storage section 104 stores the visual image of the logo mark received from the background separation section 103 and the meta-information received from the PDL interpretation section 101 as the reference image and the reference attribute information, respectively.

Next, a description is made of a procedure for color conversion processing.

Figure 8:
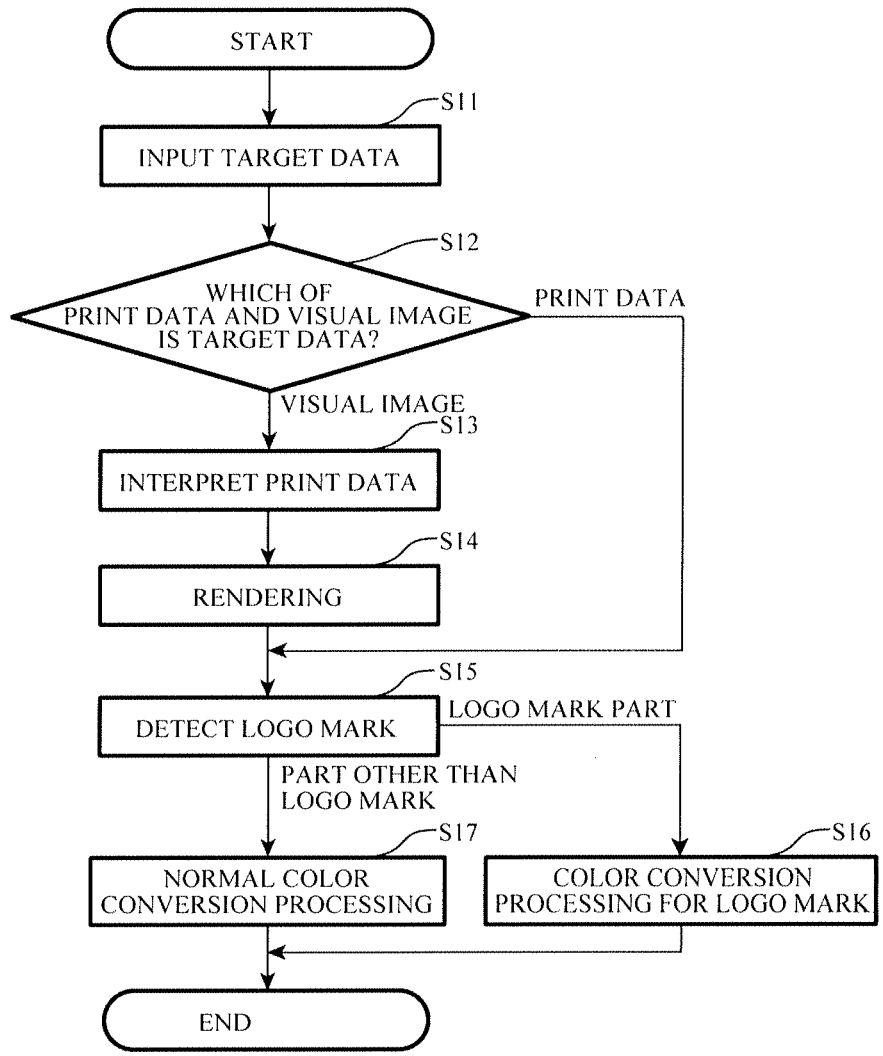
FIG. 8 illustrates a procedure for color conversion processing.
Figure 9A:
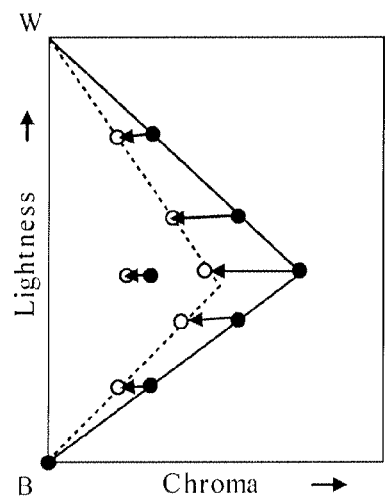
FIGS. 9A and 9B illustrate conventional color space compression.
Figure 9B:
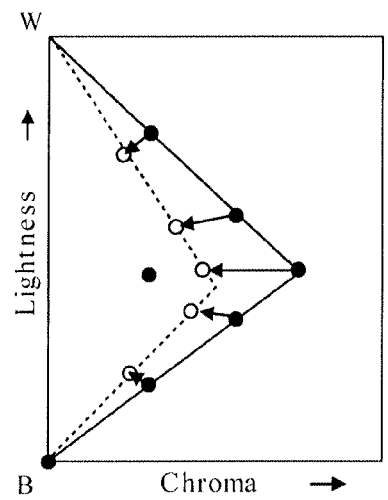

FIG. 8 illustrates a procedure for color conversion processing.

As illustrated in FIG. 8, first, target data is input (S11). For example, the print data on a target to be printed is received from the PC or the like. As another example, at the time of copy or the like, the image of the target to be printed that has been read by the scanner 12 is input.

Subsequently, it is determined which of the print data and the visual image the target data is (S12).

If the target data is the print data (S12: "print data"), the PDL interpretation section 101 interprets the print data (S13), and the rendering section 102 performs rendering therefor (S14). In this manner, the visual image of the object included in the print data is generated.

If the target data is the visual image (S12: "visual image"), or after S14, detection of the logo mark is attempted by performing the pattern matching or the like (S15).

That is, the pattern matching with the registered reference image, that is, the visual image of the logo mark in the present embodiment, is performed for the print data after being converted into the visual image through the rendering, or for the visual image obtained by the scanner 12 or the like as it is.

Note that, as an alternative to pattern matching, there is a method of searching the print data for the object having the attribute information that matches with the registered reference attribute information (attribute information specific to the logo mark), and detecting the hit object as the logo mark.

As a result, a part from which the logo mark has been detected (S15: "logo mark part") is subjected to the color conversion processing for the logo mark (S16). Specifically, the color conversion processing section 107 performs the color conversion processing by the specific color conversion method, or performs the substitution with the specific color value.

On the other hand, a part from which the logo mark has not been detected (S15: "part other than logo mark") is subjected to normal color conversion processing (S17).

Therefore, irrespective of the configuration of the image forming apparatus 1, it is possible to provide a method capable of producing the same actions and effects.

Next, an image forming program is described.

The specific graphic form storage function, the image determination function, the color conversion processing function, and the like of the computer in the image forming apparatus according to the present embodiment are realized by the image forming program stored in the ROM or the like.

The image forming program is read by a control unit (such as a CPU) of the computer, to thereby send a command to each component of the computer and to execute the sections corresponding to the respective functions (i.e., specific graphic form storage section, image determination section, and color conversion processing section).

Thus, the respective functions are realized by the image forming program (i.e. software) cooperating with the respective components of the computer (i.e. hardware resources).

Note that, the image forming program for realizing the respective functions is not only stored in the ROM or the like of the computer, but can also be stored in a computer-readable recording medium such as an external storage device and a portable recording medium.

The external storage device represents an additional memory device that incorporates a recording medium such as a compact disc-read only memory (CD-ROM) and that is externally connected to the image forming apparatus 1. On the other hand, the portable recording medium represents a recording medium that can be mounted to a recording medium drive and that can be carried around, and examples thereof include a flexible disc, a memory card, and a magneto-optical disk.

Then, the image forming program recorded in the recording medium is loaded into a RAM of the computer and executed by the CPU. This execution realizes the respective functions according to the present embodiment.

In addition, when the image forming program is loaded on the computer, the image forming program retained in another computer can also be downloaded into a personal RAM or external storage device by using a communication line. The thus-downloaded program can also realize the respective functions according to the present embodiment by being executed by the CPU.

In this manner, the present disclosure can also be carried out by the program.

Therefore, by installing the image forming program in another device according to the present embodiment, it is possible to form an apparatus that produces the same actions and effects as the image forming apparatus according to the present embodiment.

The image forming apparatus and the image forming program of the present disclosure have been described above by way of the embodiment, but it is to be understood that the present disclosure is not limited only to the present embodiment and various changes can be made thereto.

For example, the present disclosure can also be applied to an image forming apparatus other than the MFP, such as a printer, a copier, and a monitor (i.e. display).

Further, without being limited to the color conversion processing, the image processing can be executed separately for the specific graphic form and the other part.

For example, it is possible to perform a color output for the specific graphic form while performing a monochrome output for the part other than the specific graphic form, or to apply toner-saving to the part other than the specific graphic form.

The present disclosure can be applied to a color image forming apparatus, such as an MFP, a printer, and a copier.

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming apparatus, comprising:
a communication section that receives a first print data and attribute information specific to a specific graphic form;
a rendering section that renders an image from the first print data;
a background separation section that separates the specific graphic form from a background in the rendered image and outputs a visual image of the specific graphic form;
a specific graphic form storage section that stores the output visual image of the specific graphic form and the received attribute information specific to the specific graphic form as a reference image and reference attribute information, respectively;
an image determination section that:
 determines at least one of (i) whether or not an image matching with the reference image is included in target data and (ii) whether or not an image having the reference attribute information is included in the target data; and
 detects the image identified through the determination as an image corresponding to the specific graphic form; and
a color conversion processing section that performs specific color conversion processing for the image corresponding to the specific graphic form.

2. The image forming apparatus according to claim 1, wherein the image determination section further determines, if the target data is a visual image, whether or not the image matching with the reference image is included in the target data based on pattern matching between the target data and the reference image.

3. The image forming apparatus according to claim 1, wherein the image determination section further determines, if the target data is second print data, whether or not the image matching with the reference image is included in the target data based on pattern matching between a visual image of an object included in the second print data and the reference image.

4. The image forming apparatus according to claim 1, wherein:
the reference attribute information includes a color conversion method and a color value that are necessary to reproduce a color defined for the specific graphic form; and
the color conversion processing section further subjects the image corresponding to the specific graphic form to one of:
 color conversion by the color conversion method; and
 substitution by the color value.

5. The image forming apparatus according to claim 3, further comprising:
a PDL interpretation section that interprets the second print data to extract an object to be rendered and attribute information; and
a rendering section that generates the visual image.

6. The image forming apparatus according to claim 5, wherein the rendering section further generates the visual image by rasterizing the object based on the attribute information.

7. The image forming apparatus according to claim 1, wherein the specific graphic form storage section stores each piece of reference attribute information corresponding to each of objects that form the specific graphic in the output visual image.

8. A non-transitory computer-readable recording medium storing an image forming program that is executable by a processor of an image forming apparatus, the image forming program comprising:
a first program code that causes the processor to receive a first print data and attribute information specific to a specific graphic form;
a second program code that causes the processor to render an image from the first print data;
a third program code that causes the processor to separate the specific graphic form from a background in the rendered image and output a visual image of the specific graphic form;
a fourth program code that causes the processor to store the output visual image of the specific graphic form and the received attribute information specific to the specific graphic form as a reference image and reference attribute information, respectively;
a fifth program code that causes the processor to:
 determine at least one of (i) whether or not an image matching with the reference image is included in target data and (ii) whether or not an image having the reference attribute information is included in the target data; and
 detect the image identified through the determination as an image corresponding to the specific graphic form; and
a sixth program code that causes the processor to perform specific color conversion processing for the image corresponding to the specific graphic form.

9. The non-transitory computer-readable recording medium according to claim 8, wherein the fifth program code further causes the processor to determine, if the target data is a visual image, whether or not the image matching with the reference image is included in the target data based on pattern matching between the target data and the reference image.

10. The non-transitory computer-readable recording medium according to claim 8, wherein the fifth program code further causes the processor to determine, if the target data is second print data, whether or not the image matching with the reference image is included in the target data based on pattern matching between a visual image of an object included in the second print data and the reference image.

11. The non-transitory computer-readable recording medium according to claim 8, wherein:
the reference attribute information includes a color conversion method and a color value that are necessary to reproduce a color defined for the specific graphic form; and
the sixth program code further causes the processor to subject the image corresponding to the specific graphic form to one of:
 color conversion by the color conversion method; and
 substitution by the color value.

12. The non-transitory computer-readable recording medium according to claim 10, further comprising:
a seventh program code that causes the processor to interpret the second print data to extract an object to be rendered and attribute information; and
a eighth program code that causes the processor to generate the visual image.

13. The non-transitory computer-readable recording medium according to claim 12, wherein the eighth program code causes the processor to generate the visual image by causing the processor to rasterize the object based on the attribute information.

14. The non-transitory computer-readable recording medium according to claim 8, wherein the fourth program code causes the processor to store each piece of reference attribute information corresponding to each of objects that form the specific graphic in the output visual image.

15. An image forming method, comprising:
receiving, via a communication section, a first print data and attribute information specific to a specific graphic form;
rendering, via a rendering section, an image from the first print data;
separating, via a background separation section, the specific graphic form from a background in the rendered image;
outputting, via the background separation section, a visual image of the specific graphic form;
storing, via a specific graphic form storage section, the output visual image of the specific graphic form and the received attribute information specific to the specific graphic form as a reference image and reference attribute information, respectively;
determining, via an image determination section, at least one of (i) whether or not an image matching with the reference image is included in target data and (ii) whether or not an image having the reference attribute information is included in the target data, and detecting the image identified through the determining as an image corresponding to the specific graphic form; and
performing, via a color conversion processing section, specific color conversion processing for the image corresponding to the specific graphic form.

16. The image forming method according to claim 15, wherein the determining comprises determining, via the image determination section, if the target data is a visual image, whether or not the image matching with the reference image is included in the target data based on pattern matching between the target data and the reference image.

17. The image forming method according to claim 15, wherein the determining comprises determining, via the image determination section, if the target data is second print data, whether or not the image matching with the reference image is included in the target data based on pattern matching between a visual image of an object included in the second print data and the reference image.

18. The image forming method according to claim 15, wherein:
the reference attribute information includes a color conversion method and a color value that are necessary to reproduce a color defined for the specific graphic form; and
the performing comprises subjecting, via the color conversion processing section, the image corresponding to the specific graphic form to one of:
color conversion by the color conversion method; and
substitution by the color value.

19. The image forming method according to claim 17, further comprising:
interpreting, via a PDL interpretation section, the second print data to extract an object to be rendered and attribute information; and
generating, via a rendering section, the visual image.

20. The image forming method according to claim 19, wherein generating the visual image includes rasterizing the object based on the attribute information.

21. The image forming method according to claim 15, wherein the specific graphic form storage section stores each piece of reference attribute information corresponding to each of objects that form the specific graphic in the output visual image.

* * * * *